United States Patent [19]

Mazurek

[11] Patent Number: 5,597,605
[45] Date of Patent: Jan. 28, 1997

[54] REDUCED CALORIE FAT COMPONENT

[75] Inventor: Harry Mazurek, Bala Cynwyd, Pa.

[73] Assignee: ARCO Chemical Technology, L.P., Greenville, Del.

[21] Appl. No.: 386,049

[22] Filed: Feb. 9, 1995

[51] Int. Cl.⁶ ........................................ A23D 9/02
[52] U.S. Cl. .......................... 426/611; 426/804
[58] Field of Search ..................... 426/611, 804

[56] References Cited

U.S. PATENT DOCUMENTS

| | | | |
|---|---|---|---|
| 4,849,242 | 7/1989 | Kershner | 426/601 |
| 4,861,613 | 8/1989 | White et al. | 426/611 |
| 5,059,443 | 10/1991 | Ennis et al. | 426/531 |
| 5,077,073 | 12/1991 | Ennis et al. | 426/531 |
| 5,118,448 | 6/1992 | Cooper | 554/168 |
| 5,135,683 | 8/1992 | Cooper | 554/151 |
| 5,175,323 | 12/1992 | Cooper | 554/164 |
| 5,266,346 | 11/1993 | Klemann et al. | 426/611 |
| 5,288,884 | 2/1994 | Cooper | 554/168 |
| 5,298,637 | 3/1994 | Cooper | 554/169 |
| 5,304,665 | 4/1994 | Cooper et al. | 554/149 |
| 5,371,253 | 12/1994 | Cooper | 554/173 |
| 5,387,429 | 2/1995 | Cooper | 426/611 |
| 5,399,729 | 3/1995 | Cooper et al. | 554/149 |
| 5,494,693 | 2/1996 | Cooper | 426/611 |
| 5,512,313 | 4/1996 | Cooper | 426/611 |

FOREIGN PATENT DOCUMENTS

| | | |
|---|---|---|
| 0433016 | 11/1990 | European Pat. Off. . |
| 0481523 | 10/1991 | European Pat. Off. . |
| 0571219 | 5/1993 | European Pat. Off. . |
| 207070 | 4/1982 | Germany . |
| 9201386 | 2/1992 | WIPO . |

*Primary Examiner*—Carolyn Paden
*Attorney, Agent, or Firm*—Stephen D. Harper

[57] ABSTRACT

Low calorie fat components which have a low solids content but a reduced tendency to exhibit the gastrointestinal side effects typically associated with liquid fat substitutes are obtainable by blending esterified propoxylated glycerin materials having a relatively high solids content at 21° C. with certain liquefying agents. The liquefying agents are characterized by their compatibility with the esterified propoxylated glycerin and their partial digestibility. The low calorie fat components have improved organoleptic qualities as compared to the esterified propoxylated glycerin materials alone.

16 Claims, No Drawings

REDUCED CALORIE FAT COMPONENT

FIELD OF THE INVENTION

This invention relates to fat components which are useful in the preparation of reduced calorie food products. More particularly, the invention pertains to blends of digestion resistant esterified propoxylated glycerins with partially digestible liquefying agents. Such blends are low in caloric content and have excellent mouthfeel and other organoleptic qualities, yet exhibit a surprisingly reduced tendency to cause gastrointestinal side effects.

BACKGROUND OF THE INVENTION

A wide variety of substances have been proposed for use as fat substitutes in food compositions. The chemical structures of such substances are selected such that they are more resistant to breakdown by the metabolic processes of the human digestive system which normally occur upon ingestion of conventional triglyceride lipids. Because of their increased resistance to digestion and absorption, the number of calories per gram available from the fat substitutes is considerably reduced as compared to common vegetable oils, animal fats, and other triglyceride lipids. The use of such substances thus enables the preparation of reduced calorie food compositions useful in the control of body weight.

U.S. Pat. No. 4,861,613 describes the preparation of one class of particularly useful fat substitutes wherein a polyol such as glycerin is highly alkoxylated with an epoxide such as propylene oxide and then esterified with any of a number of fatty acids or equivalent thereof to form an esterified alkoxylated polyol. These substances have the physical and organoleptic properties of conventional triglyceride lipids, yet are significantly lower in available (absorbed) calories than edible oils owing to their pronounced resistance towards pancreatic lipase enzymatic hydrolysis. The thermal and oxidative stability of the esterified alkoxylated polyols renders them especially suitable for use in the preparation of reduced calorie food compositions requiring exposure to high temperatures.

Unfortunately, as a consequence of their hydrolytic stability and low digestibility, the esterified alkoxylated polyols described in U.S. Pat. No. 4,861,613 which are substantially liquid at body temperature may tend to cause certain undesirable gastrointestinal side effects when consumed at high levels in the diet. That is, since such esterified alkoxylated polyols are not readily broken down into simpler substances upon ingestion, they largely retain their oily, fat-like character and pass through the digestive tract in substantially unaltered form. Problems with diarrhea, leakage of the fat substitute through the anal sphincter (sometimes referred to as "passive oil loss"), separation of the fat substitute as an oil from the excreted fecal matter, and shortened bowel transition times resulting in gastrointestinal discomfort can occur as a result of the non-digestibility of the fat substitute. Liquid fat substitutes other than esterified alkoxylated polyols which are similarly resistant towards digestion are known to produce comparable gastrointestinal side effects. Examples include sucrose polyester which is esterified with up to 8 fatty acid groups; see U.S. Pat. Nos. 3,954,976, 4,005,195, 4,005,196, and 5,006,360. Obviously, such problems will greatly limit the maximum usage level of these substances which can be tolerated in various food compositions, thereby constraining the amount of conventional triglyceride and the number of calories which can be removed from certain foods.

European Patent Publication No. 571,219 proposes the use of certain esterified propoxylated glycerin fat substitutes which have a particular distribution of fatty acids incorporated therein to achieve a minimum solids content at 27° C. as a means of alleviating such gastrointestinal side effects. As a result of the relatively high solids content, however, such substances may tend to have an undesirable waxy or greasy mouthfeel, thereby limiting their utility in food products which normally require the incorporation of a liquid oil as the fat component. EP 571,219 suggests that this problem may be alleviated by combining the esterified propoxylated glycerin with a liquid triglyceride lipid; for example, fine particles of the fat substitute may be advantageously dispersed in a matrix of the liquid triglyceride lipid. Such a solution, however, is not entirely satisfactory since the caloric content of the esterified propoxylated glycerin is increased considerably by the addition of the triglyceride, which contains 9 calories per gram. That is, one can improve the organoleptic qualities of the esterified propoxylated glycerin by such blending, but at the expense of a less significant reduction in calories than would be achieved if the esterified propoxylated glycerin could be used as the sole fatty material in the food product.

SUMMARY OF THE INVENTION

This invention provides a reduced calorie fat component comprised of a digestion resistant esterified propoxylated glycerin having a relatively high solids content and a partially digestible liquefying agent having a relatively low solids content.

The esterified propoxylated glycerin has a dilatometric solid fat index of at least 50 at 21° C. and at least 10 at 37° C. and structure $$\begin{bmatrix} -O+C_3H_6O\,\overline{)_x}\,X \\ -O+C_3H_6O\,\overline{)_y}\,Y \\ -O+C_3H_6O\,\overline{)_z}\,Z \end{bmatrix}$$

wherein x, y, and z are each at least 1, the sum of x+y+z is from 3 to 20, and X, Y, and Z are the same or different and are selected from the group consisting of H and

where R is a $C_4$–$C_{23}$ aliphatic group, subject to the proviso that at least two of X, Y, or Z are

The partially digestible liquefying agent has a dilatometric solid fat index of less than 50 at 21° C. and less than 10 at 37° C. and structure $$\begin{bmatrix} -O+C_3H_6O\,\overline{)_a}\,A \\ -O+C_3H_6O\,\overline{)_b}\,B \\ -O+C_3H_6O\,\overline{)_c}\,C \end{bmatrix}$$

wherein a, b, and c are 0 or an integer of from 1 to 20, the sum of a+b+c is from 1 to 20, at least one of a, b, or c is 0, and A, B, and C are the same or different and are selected from the group consisting of H and

wherein $R^1$ is a $C_4$–$C_{23}$ aliphatic group subject to the proviso that at least two of A, B, or C are

An amount of the partially digestible liquefying agent sufficient to reduce the dilatometric solid fat index of the fat component to less than 50 at 21° C. and less than 10 at 37° C. is combined with the esterified propoxylated glycerin.

DETAILED DESCRIPTION OF THE INVENTION

The esterified propoxylated glycerin may be any of such substances known in the art which have a solid fat index (as measured by dilatometry) of greater than 50 at 21° C. (ca. room temperature) and greater than 10 at 37° C. (average human body temperature) which are resistant to digestion. In this context, "digestion resistant" means that metabolic breakdown and absorption of the esterified propoxlated glycerin is hindered to the extent that the compound provides less than 3 kilocalories of energy per gram when orally ingested by a human, as compared to the 9 kilocalories of energy per gram derived from conventional triglyceride lipids. In a preferred embodiment, the esterified propoxylated glycerin furnishes less than 1 kilocalorie per gram of energy. The esterified propoxylated glycerins suitable for use in the fat component of this invention have a relatively high solid fat index at room temperature; the SFI may, for example, be 50, 60, 70 or even higher at 21° C. Such materials will consequently be quite hard and "waxy" at ambient temperatures; the organoleptic qualities of food compositions containing esterified propoxylated glycerin fat substitutes of this type alone may often be adversely affected. Incorporation of the liquefying agent renders these esterified propoxylated glycerins considerably softer in consistency and thus more pleasing to the palate in certain food formulations.

Suitable esterified propoxylated glycerins may be prepared by adaption of any of the synthetic methods known in the art as exemplified by the teachings of U.S. Pat. Nos. 4,861,613, 5,175,323, 4,983,329, 5,304,665, and 5,288,884 and European Pat. Pub. No. 619,291.

Generally speaking, esterified propoxylated glycerin materials meeting the necessary solid fat index criteria may be readily obtained by manipulation of the oxypropylene and fatty acid content of the esterified propoxylated glycerin. The solids content at a given temperature, for example, may be increased by either decreasing the number of oxypropylene units per glycerin or increasing the proportion of long chain saturated fatty acid acyl groups.

Especially preferred for use are esterified propoxylated glycerin fat substitute compositions of the type disclosed in European Pat. Pub. No. 571,219, which contain a relatively high proportion of $C_{20}$–$C_{24}$ saturated linear fatty acid ester groups. Such compositions have an average number of oxypropylene units per equivalent of glycerin of from 3 to 20, a fatty acid acyl group content such that at least 40 mole percent of the fatty acid acyl groups in the composition are derived from a $C_{20}$–$C_{24}$ saturated linear fatty acid, and a solid fat index at 27° C. as measured by dilatometry of at least 30 (to be suitable for use in the present invention, the compositions must also meet the requirement that the SFI be at least 50 at 21° C. and at least 10 at 37° C.). The substances described in EP 571,219 have the desirable property of having a reduced tendency to display gastrointestinal side effects when ingested as compared to other types of esterified propoxylated glycerin fat substitutes.

Such substances are obtainable by alkoxylating glycerin with from 3 to 20 equivalents of propylene oxide per equivalent of glycerin, preferably under base-catalyzed conditions, to yield a propoxylated glycerin composition and esterifying the propoxylated glycerin composition with at least one fatty acid or fatty acid equivalent, selected such that the resulting fatty acid-esterified propoxylated glycerin composition has a solid fat index at 27° C. as measured by dilatometry of at least 30 and a fatty acid acyl group content wherein at least 40 mole percent (more preferably, at least 60 mole percent) of the fatty acid acyl groups are derived from one or more $C_{20}$–$C_{24}$ saturated linear fatty acids. "Derived from" in this context means that the acyl group has a long chain hydrocarbyl structure analogous to that present in a $C_{20}$–$C_{24}$ saturated linear fatty acid.

Preferred $C_{20}$–$C_{24}$ saturated fatty acids are linear (i.e., non-branched) and contain only one carboxylic acid functionality. The acyl group may thus correspond to the general structure

wherein n is an integer of from 18 to 22. The value of n is most conveniently an even number (e.g., 18, 20, or 22) since the corresponding fatty acids are readily available at low cost from natural sources such as edible triglycerides. Specific illustrative fatty acids suitable for use include, but are not limited to eicosanoic (arachidic) acid, heneicosanoic acid, docosanic (behenic) acid, tricosanoic acid, and tetracosanoic (lignoceric) acid. Mixtures of these $C_{20}$–$C_{24}$ saturated fatty acids may also be utilized to advantage. The long chain saturated fatty acid most preferred for use is behenic acid (i.e., the acyl group has the structure

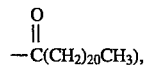

both because it effectively imparts desirable physiological properties to an esterified propoxylated glycerin composition and because it is readily available by hydrogenation of the erucic acid derived from the triglycerides present in rapeseed oil.

While all of the acyl groups in the preferred esterified propoxylated glycerin composition may be derived from $C_{20}$–$C_{24}$ saturated linear fatty acids, up to 60 mole % of the acyl groups may be derived from other $C_5$–$C_{24}$ fatty acids. Preferably, the proportion of such other acyl groups is less than 40 mole %. Generally speaking, the incorporation of acyl groups which are relatively short in length ($C_5$–$C_{18}$), unsaturated, and/or branched will tend to lower the solid fat index at 27° C. of the resulting esterified propoxylated glycerin.

The fatty acids which optionally may be used in combination with the $C_{20}$–$C_{24}$ saturated linear fatty acids may be any of the known fatty acids such as caprylic acid, pelargonic acid, capric acid, lauric acid, palmitic acid, stearic acid, oleic acid, cetoleic acid, myristic acid, palmitoleic acid, gadoleic acid, erucic acid, rincinoleic acid, linoleic acid, linolenic acid, myristoleic acid, eleostearic acid, arachidonic acid, or mixtures or hydrogenated derivatives of these acids. Preferably, linear monocarboxylic acids containing from 0 to 5 double bonds are employed.

The liquefying agent used in preparing the fat component of this invention may be any partially digestible compound containing glycerol

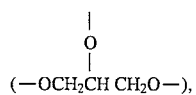

oxypropylene

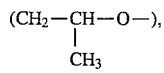

and fatty acid acyl moieties

wherein at least one but no more than two of the fatty acid acyl moieties are attached directly to glycerol, and having a dilatometric solid fat index of less than 50 at 21° C. and less than 10 at 37° C. It has been unexpectedly discovered that such compounds effectively modify the melting profile of the esterified propoxylated glycerin previously described so as to provide a fat component which is significantly more acceptable in terms of mouthfeel titan the esterified propoxylated glycerin above, yet do not greatly increase the tendency of the fat component to cause gastrointestinal side effects (unlike highly liquid esterified propoxylated glycerin materials) or the caloric content of the fat component (unlike conventional triglyceride lipids). The solids content of the fat component over the temperature range between ambient temperature and body temperature (21° C. to 37° C.) is sufficiently decreased such that the fat component imparts a less waxy or greasy mouthfeel when consumed as part of a food product. The liquefying agent, as a consequence of its partial digestibility, is sufficiently metabolized by the body or converted into more hydrophilic substances by the time the fat component exits the lower gastrointestinal tract that it does not contribute significantly to passive oil loss through the anal sphincter, yet at the same time provides less than the 9 kilocalories per gram which would have been supplied by a conventional triglyceride lipid. At the same time, the esterified propoxylated glycerin remains in substantially unaltered form upon passage through the digestive system, but does not, because of its highly solid character, tend to "leak" as an oil or otherwise provoke gastrointestinal side effects.

In this context "partially digestible" means that the liquefying agent has a caloric content of from 3 to 7 kilocalories per gram. At 3 kilograms per gram or less, the liquefying agent would contribute to oil leakage, while above 7 kilocalories per gram little advantage would be realized over a liquid vegetable or animal fat. Partial digestibility is achieved by having from one to two fatty acid ester groups attached directly to glycerol in the individual molecules of the liquefying agent. Such compounds are sometimes referred to as "esterified propoxylated monoglycerides" and "esterified propoxylated diglycerides".

Suitable liquefying agents meeting the solid fat index criteria set forth in the Summary of the Invention may be obtained by any appropriate method. For example, glycerin may be incompletely propoxylated (i.e., less than 95% of the primary hydroxy groups in glycerin are converted to secondary hydroxy groups through reaction with propylene oxide) and the resulting propoxylated glycerin then esterified with a suitable fatty acid source. Such preparation methods are described in U.S. Pat. No. 4,861,613. Alternative methods include the use of blocking groups such as ketal, acetal, benzyl, or tertiary alkyl groups to prevent propoxylation at one or two positions of the glycerin. The blocking group(s) is then removed prior to esterification. Such methods are well-known and are described, for example, in European Pat. Pub. No. 481,523 and U.S. Pat. Nos. 5,118,448, 5,135,683, and 5,371,253.

The solid fat index of the liquefying agent may be readily maintained at the desired value by manipulation of the chemical composition of the liquefying agent. For example, increasing the proportion of unsaturated or polyunsaturated fatty acid acyl groups relative to saturated fatty acyl groups, increasing the number of oxypropylene units per equivalent of glycerin, increasing the number of different fatty acid acyl groups, increasing the proportion of short chain fatty acid acyl groups (e.g., $<C_{18}$) relative to long chain fatty acyl groups (e.g., $\geq C_{18}$), or increasing the proportion of branched fatty acid acyl groups relative to linear (straight chain) fatty acid acyl groups will generally, all other factors being the same, tend to lower the solid fat index at a given temperature.

The amount of liquefying agent combined with the esterified propoxylated glycerin must be sufficient to provide a reduced calorie fat component having a dilatometric solid fat index of less than 50 at 21° C. and less than 10 at 37° C. The minimum quantity required for this purpose will vary depending upon a number of factors, including the individual solids content of each component, but may be readily determined by standard experimental techniques. For example, mixtures of liquefying agent and esterified propoxylated glycerin may be prepared by blending the two components, preferably under conditions such that both ingredients are fully liquified (melted) to form a homogeneous mass. The solid fat index at 21° C. and 37° C. of the blend is measured using standard dilatometric procedures (i.e., in accordance with A.O.C.S. Official Method Cd 10-57). The proportion of liquefying agent relative to esterified propoxylated glycerin is incrementally increased until the solid fat index drops below 50 at 21° C. and below 10 at 37° C. An excess of liquefying agent may advantageously be used, particularly when it is also desired to lower the solid fat index of the esterified propoxylated glycerin at a certain temperature or range of temperatures so as to render the fat component more suitable for use in a particular food formulation. For example, a food product which requires the use of a fat which is a free-flowing liquid at room temperature may favor the selection of a fat component in accordance with this invention which has a liquefying agent concentration greater than the minimum level needed to depress the SFI at 21° C. below 50. At the same time, it will generally be desirable, unless necessitated by the characteristics of the food product being formulated, to minimize the proportion of liquefying agent employed so as to keep the caloric content of the resulting food product as low as possible. Generally speaking, weight ratios of from 1:99 to 99:1 (liquefying agent: esterified propoxylated glycerin) may be utilized, consistent with the requirement that the solid fat index of the fat component be maintained below 50 at 21° C. and below 10 at 37° C.

The liquefying agent and the esterified propoxylated glycerin may be synthesized separately and then combined using any appropriate technique such as milling, melt-blending, or the like or, in some cases, be simultaneously generated by use of standard propoxylation and esterification methods.

The fat components of this invention may be used as partial or total (100%) replacements for conventional lipids (triglycerides) in any edible fat-containing food composition. The amount of the fat component employed is sufficient to effectively reduce the available calories of the food composition as compared to a food composition prepared using an equivalent amount (weight or volume) of a conventional fully digestible triglyceride lipid alone. Preferably, at least about 25 percent (more preferably, at least about 50 percent by weight; most preferably, 100 percent by weight) of the total fat content of the food composition is comprised of the present fat component.

The fat component of this invention can replace, in full or in part, a triglyceride lipid in a cooking oil, frying oil, salad oil, or shortening, for example. Additional uses include combining the fat component with other foodstuff ingredients to form food compositions such as frozen desserts (e.g., sherbet, ice cream, frozen yogurt, milk shakes), baked goods (cakes, doughnuts, muffins, brownies, breads, pies, rolls, pastries, cookies, biscuits, crackers), nut butters (peanut butter), dairy products (margarine, sour cream, coffee lighteners, cheese, cheese spreads, flavored dips, filled cream, filled milk), mayonnaise, salad dressing, savory snacks (potato chips, corn chips, cheese puffs, pretzels), fried foods (fried poultry, fritters, fried pies, fried vegetables such as french fried potatoes, fried fish), reformed and comminuted meats (lunch meats, sausage, hot dogs, hamburger), pet foods, meat and egg substitutes or extenders, whipped toppings, gravies and other sauces, frostings, fillings, icings, cocoa butter replacements or blends, candies (especially those normally containing fatty ingredients such as chocolate or peanut butter), soups, and dry baking mixes (for muffins, cakes, pancakes, waffles, brownies, and the like). Owing to the fat-like properties and stability of the fat components, minimum reformulation of standard food compositions will generally be required. The viscosity, melting profile, yield point, hardness, thixotropic area, liquid/solid stability, solid fat index (at different temperatures), and other physical properties of the fat component are preferably selected such that they mimic as closely as possible the analogous properties of the conventional triglyceride being replaced.

Illustrative ingredients which may be used in combination with the fat component of this invention include non-fat ingredients and fatty ingredients such as carbohydrates (flour, starches, sugars, celluloses), edible lipids (triglycerides), proteins (from animal or vegetable sources), vitamins, antioxidants, emulsifiers, thickeners, preservatives, colorants, flavors, fragrances, sugar substitutes (saccharin, aspartame, sucralose, cyclamates, and the like), other fat substitutes or fat mimetics (for example, sucrose polyester, sorbitol polyester or caprenin), water, milk, spices, eggs, and the like. Oil-in-water or water-in-oil emulsions can be readily prepared by combining water, the fat component and, optionally, other ingredients such as emulsifiers. The fat components of this invention are particularly suitable for the preparation of food compositions requiring exposure to elevated temperatures. Unlike other proposed fat substitutes such as proteinaceous macrocolloids or certain polysaccharide-based substances requiring water to render them fat-like in texture, the fat components of this invention are exceptionally stable thermally and do not readily decompose or lose their fat-like properties when heated. The fat components thus may readily be utilized in deep fat frying applications to prepare fried foods such as savory snacks, fried chicken, fried fish, french fries, and the like since they will function as effective heat transfer media (that is, they will transmit heat rapidly and uniformly to the food being fried and also provide crisping). In a preferred embodiment which helps minimizes the caloric value and fat content of the food composition, the food composition is characterized by the absence of a triglyceride lipid.

From the foregoing description, one skilled in the art can readily ascertain the essential characteristics of this invention and, without departing from the spirit and scope thereof, can make various changes and modifications of the invention to adapt it to various usages, conditions, and embodiments.

The following examples further illustrate the components and food compositions of this invention, but are not limitative of the invention in any manner whatsoever.

EXAMPLES

Esterified Propoxylated Glycerins

EPG-1: Prepared by fully esterifying a propoxylated glycerin containing an average of approximately 8 equivalents of propylene oxide (i.e., about 8 oxypropylene segments) per glyceryl residue with a mixture of ca.85% behenic acid and ca. 15% stearic acid. SFI: at 21° C.=81, at 27° C.=76.

EPG-2: Prepared by fully esterifying a propoxylated glycerin containing an average of approximately 8 equivalents of propylene oxide per glyceryl residue with 3 parts of a mixture of ca.85% behenic acid and ca. 15% stearic acid and 1 part of a mixture of soybean fatty acids. SFI: at 21° C.=52, at 27° C.=40.

EPG-3: Prepared by fully esterifying a propoxylated glycerin containing an average of approximately 5 equivalents of propylene oxide per glycerol residue with a mixture of hydrogenated canola oil fatty acids (85%) and hydrogenated canola oil fatty acids (15%). SFI: at 21° C.=86, at 27° C.=67, at 37° C.=18.

EPG-4: Prepared by fully esterifying a propoxylated glycerin containing an average of approximately 8 equivalents of propylene oxide per glycerol residue with 3 parts by weight of a 85/15 behemic acid/stearic acid blend and 1 part by weight strearic acid. SFI: at 21° C.=75, at 27° C.=71.

EPG-5: Prepared by fully esterifying a propoxylated glycerin containing an average of approximately 5 equivalents of propylene oxide per glyceryl residue with a mixture of 9 parts hydrogenated rapeseed oil fatty acids and 1 part soybean fatty acids. SFI at 21° C.=67, at 37° C.=28.

Liquefying Agents

LA-1: Prepared by fully esterifying an incompletely propoxylated glycerin containing an average of approximately 2 equivalents of propylene oxide per glyceryl residue with corn oil fatty acids.

LA-2: An esterified propoxylated diglyceride prepared in accordance with Example 3 of U.S. Pat. No. 5,135,683 containing fatty acid acyl groups derived from soybean oil fatty acids and an average of approximately 8.1 equivalents of propylene oxide per glyceryl residue.

LA-3: An esterified propoxylated monoglyceride prepared in accordance with Example 1 of U.S. Pat. No. 5, 118,448 containing fatty acid acyl groups derived from soybean oil fatty acids and an average of approximately 8 equivalents of propylene oxide per glyceryl residue.

LA-4: An esterified propoxylated diglyceride prepared in accordance with the process described in U.S. Pat. No. 5,371,253, containing an average of approximately 3 equivalents of propylene oxide per glycerol residue and fatty acid acyl groups derived from coconut oil fatty acids.

LA-5: An esterified propoxylated monoglyceride prepared in accordance with the process described in U.S. Pat. No. 5,118,448 containing an average of approximately 6 equivalents of propylene oxide per glycerol residue and fatty acid acyl groups derived from cottonseed oil.

Fat Components

Fat components in accordance with the present invention are prepared by melt-blending combinations of the above-listed esterified propoxylated glycerins and liquefying agents in the proportions shown in Table I.

TABLE I

| Fat Component No. | Esterified Propoxylated Glycerin | Wt % | Liquefying Agent | Wt % |
|---|---|---|---|---|
| FC-1 | EPG-1 | 60 | LA-1 | 40 |
| FC-2 | EPG-2 | 90 | LA-2 | 10 |
| FC-3 | EPG-3 | 75 | LA-3 | 25 |
| FC-4 | EPG-4 | 85 | LA-4 | 15 |
| FC-5 | EPG-5 | 80 | LA-5 | 20 |
| FC-6 | EPG-1 | 70 | LA-5 | 30 |
| FC-7 | EPG-2 | 85 | LA-4 | 15 |
| FC-8 | EPG-3 | 50 | LA-3 | 50 |
| FC-9 | EPG-4 | 65 | LA-2 | 35 |
| FC-10 | EPG-5 | 40 | LA-1 | 60 |

The utility of the fat components of this invention as reduced calorie fat substitutes in the preparation of food products is demonstrated by frying potato chips using the following procedure:

Whole peeled Norchip potatoes are sliced, washed in water and then fried in fat component FC-5 at 375° F. to the desired color. The excess fat component is shaken off and the chips are salted. For comparative purposes, potato chips are also prepared using the same procedure but using 100% esterified propoxylated glycerin EPG-5 as the frying medium. The chips thus obtained are predicted to have a waxier taste than the chips fried in fat component FC-5.

I claim:

1. A reduced calorie fat component comprised of
(a) a digestion resistant esterified propoxylated glycerin having a dilatometric solid fat index of at least 50 at 21° C. and at least 10 at 37° C. and structure

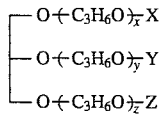

wherein x, y, and z are each at least 1, the sum of x+y+z is from 3 to 20, and X, Y, and Z are the same or different and are selected from the group consisting of H and

wherein R is a $C_4$–$C_{23}$ aliphatic group and at least two of X, Y, or Z are

and
(b) a partially digestible liquefying agent having a dilatometric solid fat index of less than 50 at 21° C. and less than 10 at 37° C. and structure

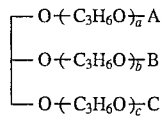

wherein a, b, and c are 0 or an integer of from 1 to 20, the sum of a+b+c is from 1 to 20, at least one of a, b, or c is 0, and A, B, and C are the same or different and are selected from the group consisting of H and

wherein $R^1$ is a $C_4$–$C_{23}$ aliphatic group and at least two of A, B, or C are

wherein the partially digestible liquefying agent is present in the reduced calorie fat component in an amount effective to provide a dilatometric solid fat index of less than 50 at 21° C. and less than 10 at 37° C.

2. The reduced calorie fat component of claim 1 wherein each

is derived from $C_5$–$C_{24}$ fatty acids.

3. The reduced calorie fat component of claim 1 wherein each

is derived from a fatty acid selected from the group consisting of $C_{20}$–$C_{24}$ saturated linear fatty acids, $C_5$–$C_{19}$ fatty acids, $C_{20}$–$C_{24}$ unsaturated fatty acids and $C_{20}$–$C_{24}$ branched fatty acids, provided at least one

group in the esterified propoxylated glycerin is derived from a $C_{20}$–$C_{24}$ saturated linear fatty acid.

4. The reduced calorie fat component of claim 1 wherein X, Y, and Z are each

5. The reduced calorie fat component of claim 1 wherein A, B, C are each

6. The reduced calorie fat component of claim 1 wherein the sum of a+b+c is from 1 to 5.

7. The reduced calorie fat component of claim 1 wherein the sum of a+b+c is 1 or 2.

8. The reduced calorie fat component of claim 1 wherein two of a, b, or c are 0.

9. The reduced calorie fat component of claim 1 wherein A, B, and C are

and are the same or different and are derived from $C_5$–$C_{24}$ fatty acids.

10. The reduced calorie fat component of claim 1 wherein the digestion resistant esterified propoxylated glycerin has a dilatometric solid index of at least 30 at 20° C.

11. The reduced calorie fat component of claim 1 wherein the digestion resistant esterified propoxylated glycerin provides less than 3 kilocalories of energy per gram.

12. The reduced calorie fat component of claim 1 wherein the partially digestible liquefying agent provides from 3 to 7 kilocalories of energy per gram.

13. The reduced calorie fat component of claim 1 additionally comprising a triglyceride lipid.

14. A food composition comprised of at least one non-fat ingredient and a reduced calorie fat component comprised of (a) a digestion resistant esterified propoxylated glycerin having a dilatometric solid fat index of at least 50 at 21° C. and at least 10 at 37° C. and structure

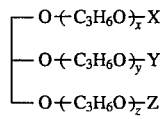

wherein x, y, and z are each at least 1, the sum of x+y+z is from 3 to 20, and X, Y, and Z are the same or different and are selected from the group consisting of H and

wherein R is a $C_4$–$C_{23}$ aliphatic group and at least two of X, Y, or Z are

and (b) a partially digestible liquefying agent having a dilatometric solid fat index of less than 50 at 21° C. and less than 10 at 37° C. and structure

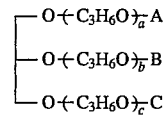

wherein a, b, and c are 0 or an integer of from 1 to 20, the sum of a+b+c is from 1 to 20, at least one of a, b, or c is 0, and A, B, and C are the same or different and are selected from the group consisting of H and

wherein $R^1$ is a $C_4$–$C_{23}$ aliphatic group and at least two of A, B, or C are

wherein the partially digestible liquefying agent is present in the reduced calorie fat component in an amount effective to provide a dilatometric solid fat index of less than 50 at 21° C. and less than 10 at 37° C.

15. The food composition of claim 14 additionally comprising a triglyceride lipid.

16. The food composition of claim 15 wherein the triglyceride lipid is selected from the group consisting of tallow, soybean oil, cottonseed oil, coconut oil, palm kernel oil, fish oil, lard, butter fat, olive oil, palm oil, peanut oil, safflower seed oil, cocoa butter, sesame seed oil, canola oil, sunflower seed oil, fully and partially hydrogenated derivatives and mixtures thereof.

* * * * *